United States Patent [19]

Wilkinson

[11] 4,267,401
[45] May 12, 1981

[54] SEAL PLUG

[76] Inventor: William L. Wilkinson, 258 W. 31st St., Hamilton, Ontario, Canada, L9C 5G4

[21] Appl. No.: 921,825

[22] Filed: Jul. 3, 1978

[51] Int. Cl.³ .......................................... H02G 15/013
[52] U.S. Cl. .............................. 174/77 R; 174/23 R; 174/65 SS; 174/99 R; 174/151; 277/104; 277/121; 277/123
[58] Field of Search ............... 174/23 R, 65 SS, 77 R, 174/99 R, 151, 152 G, 93; 277/112, 123, 103, 104, 120, 121; 339/38; 138/89

[56] References Cited

U.S. PATENT DOCUMENTS

| 286,940 | 10/1883 | Martin | 138/108 |
|---|---|---|---|
| 1,541,756 | 6/1925 | Williams | 174/23 R X |
| 1,787,020 | 12/1930 | Sautter | 277/120 |
| 2,475,787 | 7/1949 | Kelsay | 174/65 SS X |
| 2,888,546 | 5/1959 | Kinney | 174/99 R X |
| 3,029,083 | 4/1962 | Wilde | 277/166 X |
| 3,054,847 | 9/1962 | Colbert | 174/93 X |
| 3,141,686 | 7/1964 | Smith et al. | 277/105 |
| 3,254,153 | 5/1966 | Kohler | 277/101 X |
| 3,393,917 | 7/1968 | Kendall et al. | 277/103 |
| 3,449,507 | 6/1969 | Channell | 174/93 |
| 3,458,649 | 7/1969 | Channell | 174/93 |
| 3,518,358 | 6/1970 | Brown | 174/93 |
| 3,569,608 | 3/1971 | Ance | 174/93 |
| 3,827,704 | 8/1974 | Gillemot et al. | 174/93 X |
| 3,916,086 | 10/1975 | Gillemot et al. | 174/93 |
| 4,061,344 | 12/1977 | Bradley et al. | 174/151 X |
| 4,079,193 | 3/1978 | Channell | 174/93 X |

FOREIGN PATENT DOCUMENTS

| 889923 | 8/1953 | Fed. Rep. of Germany | 174/151 |
|---|---|---|---|
| 904825 | 11/1945 | France | 174/77 R |
| 506065 | 5/1976 | U.S.S.R. | 174/151 |

Primary Examiner—Richard R. Kucia
Assistant Examiner—E. F. Borchelt
Attorney, Agent, or Firm—Stanley J. Rogers

[57] ABSTRACT

A seal plug for conduits is disclosed having a plug core including at least one radially-expansible seal member for sealing the conduit in which it is disposed, while permitting passage of cables or the like therethrough. Until required for the cable or cables, the passages in the seal plug are closed by removable pin inserts, retainer means being provided to hold the inserts in place. The plug includes longitudinal compression means to bring the seal member into sealing contact with the conduit wall. Each passage may open to the circumference of the respective seal member via slits to permit sideways insertion of the cable therein.

8 Claims, 4 Drawing Figures

SEAL PLUG

FIELD OF THE INVENTION

The present invention is concerned with improvements in or relating to seal plugs for conduits and, more particularly, it relates to such a seal plug adapted to permit passage therethrough of one or several cables or the like while providing a sealing barrier in the conduit in which it is disposed.

BACKGROUND OF THE INVENTION

Seal plugs are sometimes required, for example, in electrical conduits provided with a connector constituted by a conduit nipple portion threaded into a conduit union part. Seal plugs may also be required for example in applications wherein cables or wires are passed through a wall of an engine bearing housing and wherein a pressure differential may exist between the sides of the wall. Such a plug may also be employed where electric cables are passed from one side of a housing to the other side of the housing. Depending on the particular application, it may be necessary to close or seal off the conduit interior in order to prevent leakage of fluid, such as gas or oil. On the other hand, or in addition, it may be necessary that cables threaded through the conduit are passed through the plug without causing abrasion and the like damage to the cable, while maintaining the sealing function of the plug.

REVIEW OF THE PRIOR ART

U.S. Pat. No. 286,940 issued Oct. 16, 1883 to Martin discloses a perforated plate which serves to support wires passing therethrough. The perforated plate is fitted inside a conduit through which the wires are to pass.

U.S. Pat. No. 1,541,756 issued June 9, 1925 to O. H. Williams, discloses a closure for conduits which are intended to enclose electric conductors, the closure consisting of a plug composed of two identical parts of a compressible material, such as rubber, both parts having coincident perforations for the passage of the conductors, and also with central coincident openings for the passage of a threaded bolt by which two end compression members are drawn towards each other and against the opposite ends of the plug to expand it radially and seal the interior of the conduit.

U.S. Pat. No. 3,029,083 issued Apr. 10, 1962 to Wilde shows a seal for a drilling head in which wires are embedded in the seal. The wires are permanently set in the seal material and cannot be removed.

U.S. Pat. No. 3,254,153 issued May 31, 1966 to Kohler is concerned with a protective splice cover having an end member through which individual wires to be spliced can be passed. The end member has integral grommets formed therein with end walls which are ruptured to permit the wires to pass therethrough.

U.S. Pat. No. 3,393,917 issued July 23, 1968 to Kendall et al discloses a fluid seal having metal pins disposed therein. The seal is composed of a disc and a plurality of pins, arranged in a circular pattern, inserted in the disc. As pressure is applied to the heads of the pins, they provide expansion of the seal in outwardly direction.

U.S. Pat. No. 3,449,507 issued June 10, 1969 to Channell discloses in FIG. 2 of the drawings a resilient plug having tubes inserted through holes in the plug on one side, while on the other side the plug has bores closed by smaller plugs.

U.S. Pat. No. 3,458,649 issued July 29, 1969 to Channell discloses another cable splice sleeve in which the wires can be passed through openings, these openings being closed by plugs which are removable when required.

U.S. Pat. No. 3,518,358 issued June 30, 1970 to Brown is concerned principally with an end cap with tubular closure members, the ends of which can be cut off to permit cables to be passed therethrough.

U.S. Pat. No. 3,569,608 issued Mar. 9, 1971 to Ance shows a cable splice arrangement in which the seal assembly is compressed by a central board 14 in order to seal it against the walls of the tube in which it is inserted.

U.S. Pat. No. 3,916,086 issued Oct. 28, 1975 to Gillemot shows a design of a cable splice housing which includes plugs fitting within the housing and removable as necessary. The plug is left in place while the housing is filled with a potting compound, to ensure that the potting compound cannot escape through the enclosure.

DEFINITION OF THE INVENTION

It is accordingly an object of the present invention to provide an improved seal plug.

It is further an object of the present invention to provide a seal plug which is easily installed into and removed from its particular location.

In accordance with the present invention there is provided a seal plug for use in a conduit having a plurality of passages therethrough for receiving a respective number of elongated members therein, such as wires or the like, to pass them through the seal plug, said seal plug comprising:

a plug core including at least one radially-expansible seal member having a respective plurality of passages therethrough and adapted for insertion into said conduit in unexpanded condition, the plug core closing and sealing said conduit when inserted therein and in radially-expanded condition, and also when in the radially-expanded condition sealing around an elongated member that is inserted in its respective passage;

a pair of seal plug pressure members each having a respective plurality of passages therethrough and between which the seal member is sandwiched so as to be expanded radially upon axial movement of the pressure members toward each other;

a removable insert for each passage closing the respective passage in said seal member, and sealed in the passage along the length thereof when the plug core is in the radially-expanded condition, each removable insert consisting of a headed pin passing through the seal member and the pressure members;

retainer means engaging said removable headed pins to retain them in their respective passages, the said retainer means consisting of an apertured plate having a respective plurality of apertures therein and each having each pin head engaged in a respective aperture thereof of smaller diameter than the pin head, each pin head being forcible through the respective aperture for removal of the pin by the application of a suitable force to the pin shaft, and axial compression means passing through the seal member, the pressure members and the retainer member for moving the pressure members toward each other to axially compress the seal member and effect the said radial expansion thereof.

BRIEF DESCRIPTION OF THE DRAWINGS

Seal plugs which are particular preferred embodiments of the invention will now be described by way of example, with reference to the accompanying diagrammatic drawing, wherein.

DESCRIPTION OF THE PREFERRED EMBODIMENTS

Figure 1:
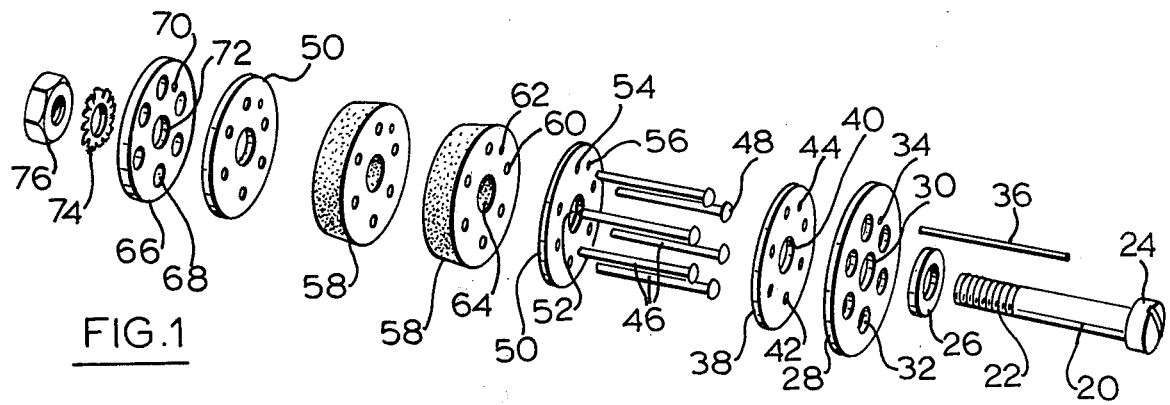
FIG. 1 is an exploded, perspective view of a seal plug which is a first embodiment of the invention to show in detail the individual parts of the plug.
Figure 2:
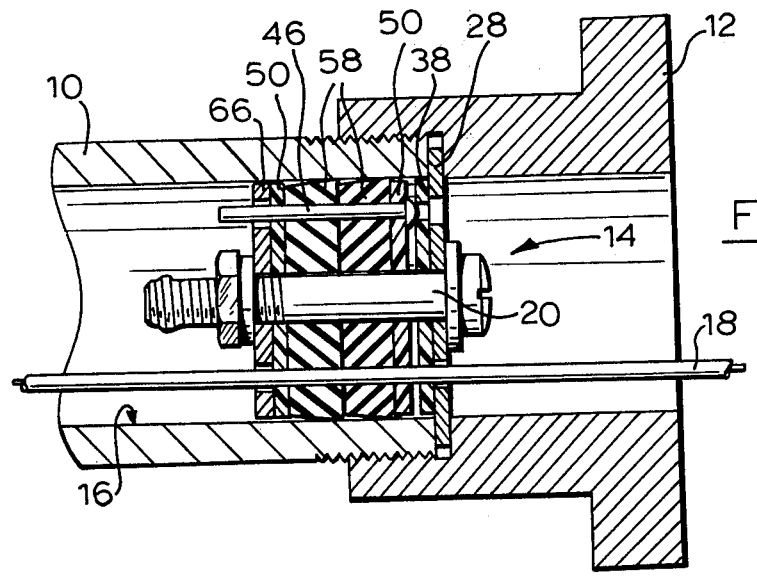
FIG. 2 is a longitudinal cross-sectional view through a conduit union and nipple showing the seal plug of FIG. 1 installed therein.

The particular embodiments described herein are all intended for sealing off one end of a conduit 10, the end being threaded to constitute a nipple and having screwed thereon a conduit union 12, as shown in FIG. 2. The seal plug of FIG. 1, generally designated 14 in FIG. 2, is disposed in longitudinal bore 16 of conduit 10 near the end shown in the drawing. A typical application of such a conduit, union and seal plug combination is to pass electric wires from the interior of a turbine engine bearing housing to the exterior thereof, without escape of oil or gas from the engine housing through the conduit, despite the pressure differential that is present; such wires are used for example, to connect internal thermocouples to exterior indicating devices. Thus, to this end non-porous insulated wire 18, for example, extends from a thermocouple (not shown) through the conduit and the seal plug to an exterior wire terminal (not shown) while the seal plug maintains the conduit interior sealed against escape of oil or gas from the bearing housing. In other constructions threads to receive a union may be formed on the bearing housing or equivalent, or a hole of appropriate diameter may be formed directly in the structure in which the seal plug is to be mounted, when a conduit is not used to provide the passage to be sealed.

The seal plug assembly of FIG. 1 comprises a central retaining bolt 20 on which the individual components of the plug are mounted, the bolt having a threaded end 22 and a head 24 and receiving thereon a washer 26. Next in the assembly is a stabilizer disc 28, preferably made of stainless steel, having a central bore 30 receiving the bolt 20 and of sufficiently large diameter to close the bore 16 of conduit 10 when placed against its end, as illustrated in FIG. 2. In this particular embodiment stabilizer disc 28 is provided with six holes 32 arranged in a circular symetrical hole pattern equally radially spaced from bolt 20 and equally spaced from one another. The size of each hole 32 is such that a cable passing therethrough does not come into contact with the disc, to avoid abrasion of the coating of the wire. Stabilizer disc 28 is also provided with an alignment hole 34 for receiving therethrough an alignment pin 36.

A pin retainer disc 38 having a cental bore 40, six holes 42 and an alignment hole 44, is next in assembly and abuts against the stabilizer disc. The diameter of the disc 38 is selected so that it can be inserted with a small clearance into the bore 16 of conduit 10. The holes 42 are arranged to register with the holes 32 of stabilizer disc 28, but are smaller in diameter. The retainer disc 38 preferably is made of an electrically non-conducting material which is heat and oil resistant, e.g. Teflon (Trade Mark) or like material.

Six round-headed seal pins 46 are provided for the core of the plug 14; the pins 46 preferably are of stainless steel. Removal of one or more of the pins from the core will provide a respective passage or passages for cables, such as the cable 18, through the seal plug. The rounded heads 48 of the pins are shaped hemispherically with a radius which will permit them to be pushed, on exertion of pressure on the shaft end while the seal plug is in its "unsealed" condition, through corresponding holes 42 in the pin retainer disc, the pins then passing readily through corresponding holes 32 in the stabilizer disc. The material of the disc 38 must therefore have a resilience such that in normal operation the heads 48 of the pins 46 will rest snugly in the respective apertures 42 without further endwise movement until the above-described substantially greater pressure is applied to the pin shaft ends. The pins are of course removed while the plug is in its unsealed state, as will be apparent from the following description.

The first of the plug core components into which the pins 46 are insertable is a first insulating disc 50 having a central bore 52 and six holes 54 which are slightly larger in diameter than the cable to be passed therethrough, which holes are in register with those of the pin retainer disc 38 and stabilizer disc 28. Insulating disc 50 also has an alignment pin-receiving hole 56 for receiving the alignment pin 36, and disc 50 is formed of the same or similar material as is the retainer disc 38.

There is next provided a first seal washer 58 having six holes 60 slightly larger in diameter than the diameter of the cable, which holes are in register with the holes of the previously-described components, an alignment pin-receiving hole 62 and a central bore 64. The circumference of the washer is conical, the end of the washer having the larger diameter being placed against insulating disc 50. In other embodiments the circumference may be convex curved with the central part of greater diameter than the two end parts. Washer 58 preferably is formed of a compressible, resilient material, such as, for example, Teflon, Buna (Trade Marks) cork or Neoprene.

A second seal washer 58 is disposed on the bolt 20 against the first seal washer, the end of the second washer of larger diameter being placed against the end of the first washer of smaller diameter. The plug core is completed by another insulating disc 50 positioned on the bolt 20 next in contact to the second seal washer 58 and, in a seal plug assembly the core of the seal plug 14 is provided by the pins 46, two discs 50 and one or more seal washers 58.

Next in the seal plug assembly is a pressure disc 66, preferably made of stainless steel, and having six holes 68 for receiving the pins 46, the holes 68 having a diameter which is approximately equal to the diameter of holes 32 in stabilizer disc 28. Pressure disc 66 also has a hole 70 for alignment pin 36 and a central bore 72 for receiving retaining bolt 20. The assembly is completed by a lock washer 74 and a nut 76 which fits onto the threaded end 22 of the retaining bolt 20. Once the seal plug has been assembled with the alignment pin 36 in position it is preferred that it not be possible to disassemble it and to this end the thread on end 22 is upset or distorted so that nut 76 cannot be removed.

As described above one or more cables, such as cable 18, can be passed through the seal plug 14 upon removal of a respective number of pins 46 from the plug core. A pin 46 is removed while the plug is in unsealed condition by forcing it with the rounded head 48 through a corresponding hole 42 in pin retainer disc 38. Due to the size of the corresponding hole 32 in the stabilizer disc 28, the pin is then free to move through the retainer disc 28. Once a pin 46 has been removed, the respective cable 18 can readily be passed through the registering holes of the plug when all of its components are in the assembled state as shown in FIG. 2. As can best also be seen with reference to FIG. 2, the seal plug 14 with its cable or cables 18 passing therethrough, is insertable into the conduit bore 16 until the stabilizer disc 26 abuts against the end of the conduit. With the exception of sealing washers 58 all components disposed in the bore are clear of the walls thereof.

Plug 14 is now sealed in the conduit bore by tightening bolt 20 in nut 76, thereby compressing the seal washers 58 between stabilizer disc 28 and pressure disc 66. This will cause radially outward bulging of the radial circumference of each washer 58, thereby increasing the sealing contact in bore 16. This compression of the seal washers 58 also acts radially inwards to seal the holes 60, 62 and 64 in the washers around the pins 46, pin 36 and bolt 20 respectively, so that a fluid-tight seal is obtained.

Figure 3:
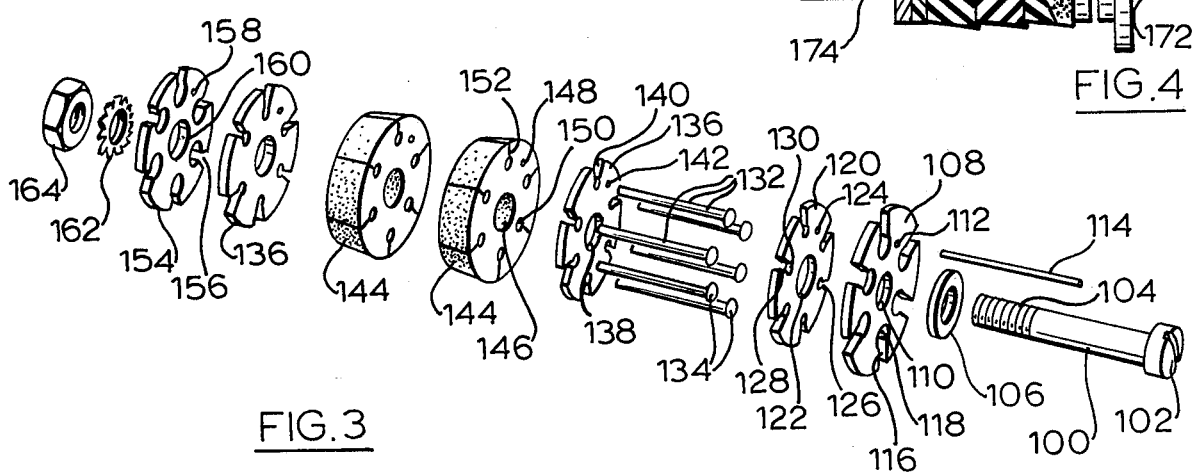
FIG. 3 is an exploded, perspective view of a seal plug which is a second embodiment of the invention.

Another embodiment of the invention is shown in FIG. 3 of the drawings and is particularly adapted for use with one or several cables which are difficult or impossible to insert lengthwise through the longitudinal passages of the plug, e.g. when the cable has coaxial connectors on both ends. This embodiment employs a central retaining bolt 100 with a head 102 and a threaded end 104, together with a standard washer 106.

The stabilizer disc 108 corresponding to disc 28 has a central bore 110 for bolt 100 and a hole 112 for alignment pin 114, but differs from disc 28 by having six radial slots 116 extending from the circumference of the disc a short distance towards the centre thereof and terminating in holes 118. The width of each slot 116 and the diameter of each hole 118 are selected so that a cable can easily be placed through the slot 116 and is clear of the walls of hole 118 when in the assembled position. The pin retainer disc 120 has a central bore 122, a hole 124 for alignment pin 114, and six keyhole-shaped openings 126 arranged in registry with slots 112 of stabilizer disc 108. Openings 126 are of a size to provide for more closely controlled retention of a cable with respect to stabilizer disc 108, and each opening typically is formed with a V-shaped mouth 128 terminating in a circular aperture 130 in which the respective cable can be lodged in assembly.

This embodiment also comprises pins 132 with rounded heads 134, which heads are adapted to cover the circular apertures 130 of disc 120. Insulating discs 136 corresponding to discs 38 are each provided with a central bore 138, a hole 142 for alignment pin 114 and six keyhole-shaped openings 140. In the assembled state of the plug, the keyhole-shaped openings of the insulating discs 136 are in line with the corresponding openings in stabilizer disc 108 and retainer disc 120.

This embodiment also employs two seal washers 144, each having a central bore 146, a hole 148 for alignment pin 114 and six holes 150 which register with the keyhole-shaped openings in the other plug elements to provide for passage of a cable through the plug. The holes 150 also have radial communicating passages to the circumference in the form of narrow slits or cuts 152 leading from the holes to the circumferential surface of the washers, the slits being in line with the corresponding radial openings of the other plug elements. The plug assembly is completed by a modified pressure disc 154 provided with openings 156, 158 and 160, which correspond to those in stabilizer disc 108, a lock washer 162 and a nut 164. The material and the function of the plug components of this second embodiment are generally the same as described for the first embodiment. Thus, seal washers 144 are compressible between retainer disc 120 and pressure disc 150 to provide a seal in bore 16 of conduit 10.

The advantage of this second embodiment resides in the relative ease with which cables can be inserted in the plug. Thus, the required number of pins 132 are removed from the plug by forcing the heads 134 through the circular apertures 130 of disc 120 and then passing the pins through the larger holes 118 of stabilizer disc 108. The cable is now placed above the slit 152 of the corresponding empty hole 150 in washer 144 and is pushed through the slit into the hole, passing at the same time through the corresponding keyhole-shaped openings and slots of the other components of the plug. Due to the resilience of the material of the seal washers 144, the slits 152 close once the cable is lodged therein and this closure is made permanent when the plug is sealed in the conduit bore.

Figure 4:
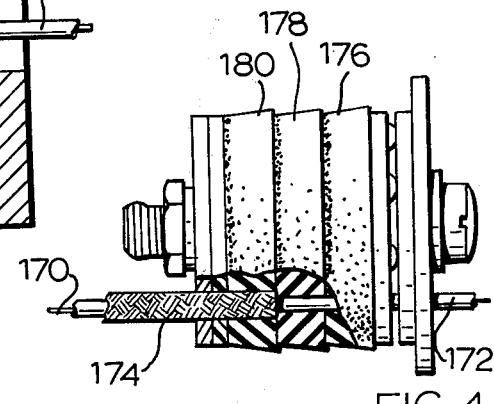
FIG. 4 is a side elevational view of a seal plug which is a third embodiment of the invention.

A further embodiment of the present invention is shown in FIG. 4 and is intended for use with a cable wire 170 encapsulated by a non-porous coating 172, which in turn is covered partially by a braided cover 174. In a particular application it may be desirable to have only the insulated coated wire emerge from the seal plug on the union side and for this purpose the seal plug is equipped with three seal washers 176, 178 and 180, but only innermost seal washer 180 is furnished with holes of a sufficient diameter to allow passage of the braided portion 174 of the cable.

It will be understood by those skilled in this particular art that other modifications may be made in other embodiments. For example, the number of pins and the corresponding openings receiving the pins in the plug assembly can be varied. The particular shape of the seal washers will depend on the material of construction that is used and the periphery of these washers may be of any shape that is conducive to providing a good seal in the particular application in which the seal plug is used. To avoid the use of indefinite language in the claims reference is made therein to use of the seal plug in "conduits" instead of the broader term "conduits and the like", and for example the plug could be used to close a bore in a turbine wall; other uses within the scope of the claims will be apparent to those skilled in the art.

I claim:

1. A seal plug for use in a conduit having a plurality of passages therethrough for receiving a respective number of elongated members therein to pass them through the seal plug, said seal plug comprising:
    a plug core including at least one radially-expansible seal member having a respective plurality of passages therethrough and adapted for insertion into said conduit in unexpanded condition, the plug core closing and sealing said conduit when inserted therein and in radially-expanded condition, and also when in radially-expanded condition sealing around an elongated member that is inserted in its respective passage;

a pair of seal plug pressure members each having a respective plurality of passages therethrough and between which the seal member is sandwiched so as to be expanded radially upon axial movement of the pressure members toward each other;

a removable insert for each passage closing the respective passage in said seal member, and sealed in the passage along the length thereof when the plug core is in the radially-expanded condition, each removable insert consisting of a headed pin passing through the seal member and the pressure members;

retainer means engaging said removable headed pins to retain them in their respective passages, the said retainer means consisting of an apertured plate having a respective plurality of apertures therein and having each pin head engaged in a respective aperture thereof of smaller diameter than the pin head, each pin head being forcible through the respective aperture for removal of the pin by the application of a suitable force to the pin shaft, and axial compression means passing through the seal member, the pressure members and the retainer member for moving the pressure members toward each other to axially compress the seal member and effect the said radial expansion thereof.

2. A seal plug as claimed in claim 1, wherein the plug core includes two end members of electrically insulating material each having a respective plurality of passages therethrough and through which each removable insert passes, each end member being interposed between a respective pressure member and the adjacent face of the said at least one seal member.

3. A seal plug as claimed in claim 1, wherein each passage in the said at least one seal member is connected to the circumference of the seal member by a slit permitting sideways insertion of the respective elongated member into the passage through the slit.

4. A seal plug as claimed in claim 1, wherein the plug core includes at least two seal members disposed end to end, each seal member having a respective plurality of passages therethrough, each seal member being of frusto-conical shape, the smaller diameter end of one member abutting the larger diameter end of the other member, and the smaller ends of the seal members being disposed toward the end of the plug receiving a higher pressure.

5. A seal plug as claimed in claim 1, wherein the said at least one seal member, the end members and the pressure members all have a respective aperture therein which are aligned with one another and through which passes an alignment pin for holding the members in alignment with one another.

6. A seal plug as claimed in claim 1, wherein the axial compression means for radially expanding the said at least one seal member consists of a non-removable axial bolt and nut member.

7. A seal plug as claimed in claim 1, wherein one of said pressure members is of smaller diameter to permit its insertion into a conduit to be sealed by the plug, and the other pressure member is of larger diameter to engage an end of the conduit.

8. A seal plug as claimed in claim 1, wherein the head of each headed pin is of hemispherical shape.

* * * * *